3,827,939
PROCESS FOR MAKING A PROTEASE FOR FOODSTUFFS
Tatsuro Tanaka, Kyoto, Masaki Terada and Mitsumune Takatsu, Osaka, and Shohei Otani, Hyogo, Japan, assignors to Nissin Shokuhin Kaisha, Ltd., Takatsuki, Osaka, Japan
Filed Feb. 22, 1972, Ser. No. 228,072
Claims priority, application Japan, June 23, 1970, 45/56,360; Aug. 13, 1970, 45/71,043
Int. Cl. C12d 13/10
U.S. Cl. 195—66 R   1 Claim

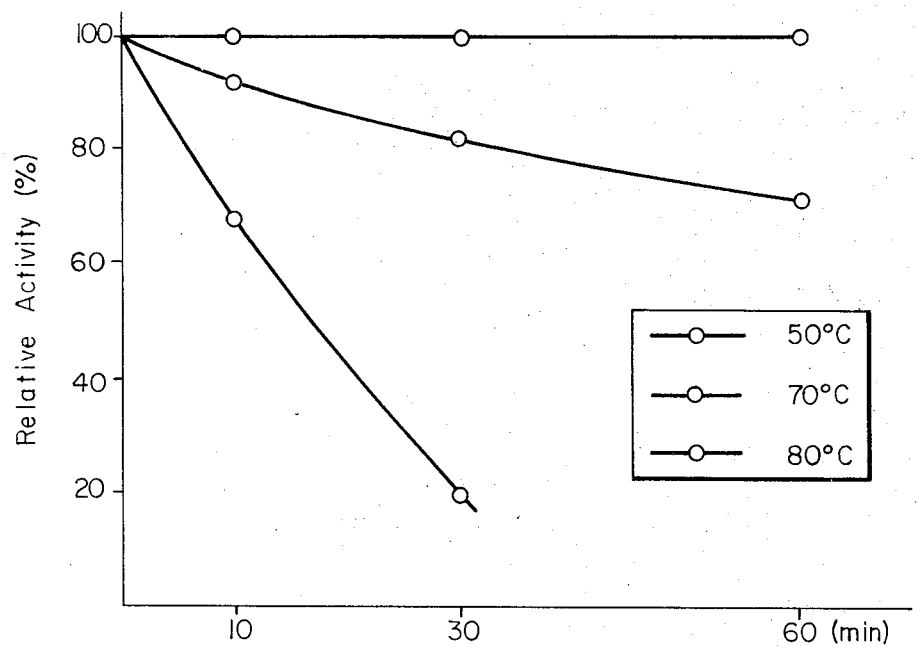
FIG. 1  Thermal Stability of Protease
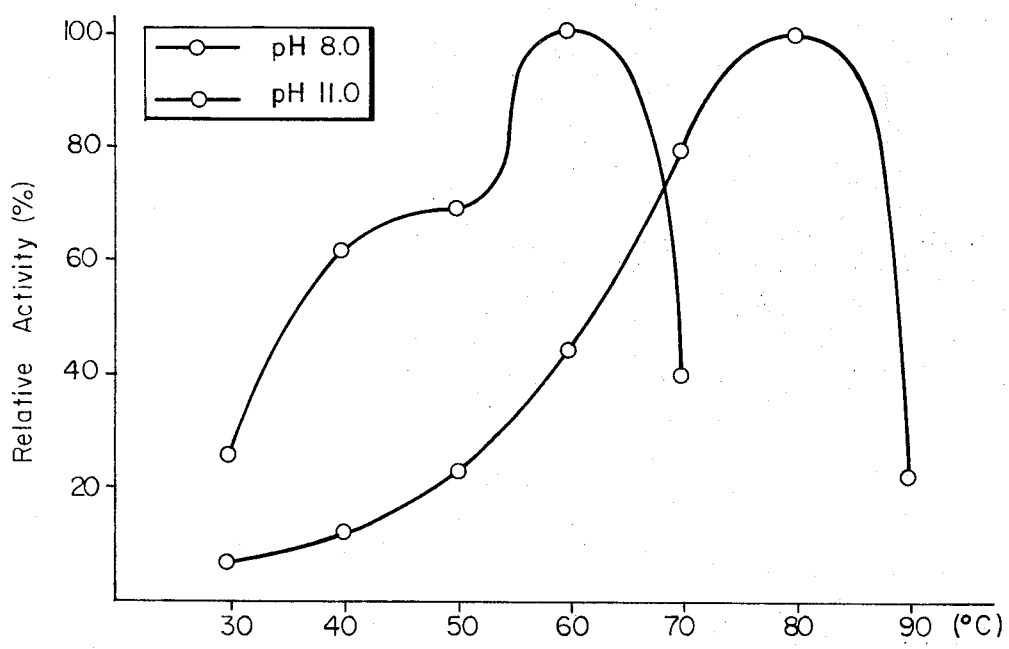
FIG. 2  Effect of Temperature on Protease Activity Chromatographic Separation of Protease on CM-Cellulose

United States Patent Office 3,827,939
Patented Aug. 6, 1974

ABSTRACT OF THE DISCLOSURE

An improved method for making protein-containing foodstuffs is provided through the treatment of the protein with a protease which allows a breakdown of the protein into simpler peptide units. A method for obtaining the novel protease of the invention is provided by culturing the microorganism *Streptomyces tanakasis* sp. 4680.

BACKGROUND OF THE INVENTION

The treatment of foodstuffs containing protein units with an enzyme to reduce the protein units into simpler peptide units has been proposed as a means to provide a more palatable food product, and one which has increased nutritional value. For example, an improve egg noodle has been proposed which has a superior food value as compare to the conventional egg noodle, and which further is resistant to coagulation upon heating and does not suffer from the characteristic "egg odor" after prolonged heat treatment common to conventional egg noodles. Such egg noodles further require less time for restoration after heat treatments than is the case with conventional egg noodles. The egg noodles are prepared by treating the egg, prior to incorporation with the flour, with a proteolytic enzyme. The nutritional value of the inclusion of protein in various food products is, of course, well recognized. For example, with respect to the inclusion of egg in egg noodles, when egg is added to a wheat product such as spaghetti, macaroni or noodles, a stable carbon-nitrogen balance is provided, as well as an increased efficiency of metastasis due to the vitamins and inorganic salts contained in the egg.

Various proteolytic enzymes have been tested in order to discover a suitable protease for the preparation of protein foodstuffs having simple peptide units. Bacteria and molds have been proposed, however their efficiency has only been in the range of 20 to 40% in the decomposition of the protein. Certain species of Actinomycrete have been proposed, with a decomposition approaching 80 to 90% of the protein.

In addition to the problem of incomplete reduction of the protein by the various proteolytic enzymes which have been compared, a further difficulty results from the fact that such enzymes are often unstable to heat treatment, and are also readily contaminated by other bacteria.

Several bacteria for producing protease have been proposed, including *Bacillus thermoproteolyticus* and *Bacillus stearothermophilus*. The protease produced from such bacteria suffer from the disadvantage of having a poor rate of decomposition of the protein. Among the Actinomycete, thermophilic Streptomyces No. 1689 and Thermomonospora No. 2517 (Japanese Patent Publication No. 3479/1965) have been proposed, but have not been found to obviate all of the drawbacks mentioned above.

It is therefore an object of the invention to provide an improved protease.

Further object of the invention is the provision of improved foodstuffs through the treatment of protein-containing foodstuffs with a highly efficient protease.

A further object of the invention is the provision of a thremostable protease which is also resistant to deterioration from other bacteria.

SUMMARY OF THE INVENTION

An improved protease is provided from cultures of the microorganism *Streptomyces tanakasis* sp. 4680. The improved protease is thermostable and provides for the efficient breakdown of protein units, particularly providing improved foodstuffs.

DETAILED DESCRIPTION OF THE INVENTION

The improved foodstuffs of the invention are provided from the treatment of the foodstuff with the protease of the invention. The foodstuff may be treated with the protease at any time during its manufacture. It has been found particularly advantageous in some instances, such as in the preparation of egg noodles, to treat the protein-portion of the foodstuff with the protease prior to incorporation with the remaining ingredients.

The various characteristics of the protease of the invention are illustrated with reference to the drawings, wherein:

FIG. 1 shows the thermal stability of the protease in the presence of $\frac{1}{100}$ mole Ca-acetate;

FIG. 2 shows the effect of temperature on protease activity at pH 8.0 and 11.0;

Figure 3:
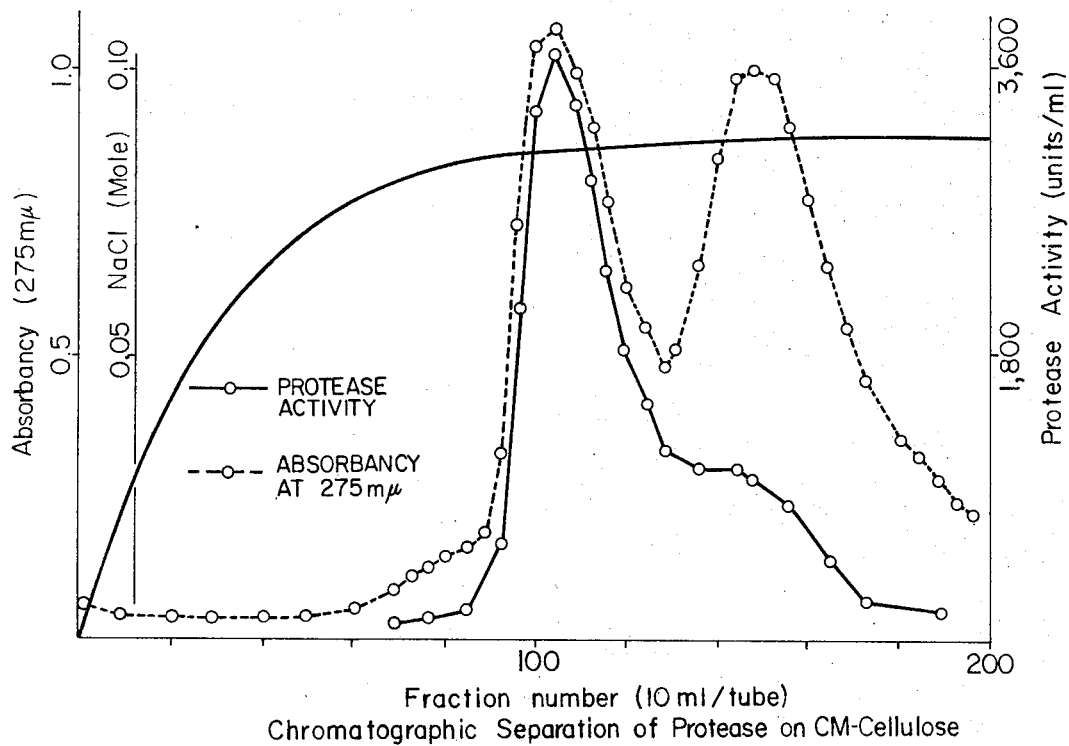
FIG. 3 shows the pattern which is obtained by CM-Cellulose column chromatography.

The protease of the invention is produced from *Streptomyces tanakasis* sp. 4680, of mesophilic Actinomycete, for which the characteristics are set forth below:

Major bacteriological properties of the Streptomyces sp. 4680 of mesophilic Actinomycete are shown hereunder.

Morphological properties

An aerial mycelium has irregular branches, and forms open spirals to become conidio spores. The mycelium is 5–20$\mu$ in length, about 1$\mu$ in width, and red-brownish gray in color. The spore is spherical or ellipsoidal, and 0.8–0.9$\mu$ x 1.0–1.2$\mu$ in size.

The vegetative mycelium forms branches of the long hypha, and does not yield any spores.

CULTURAL FEATURES (Observed on ten days after inoculation)

| | Growth | Aerial mycelium | Vegetative mycelium (reverse) | Soluble pigment |
|---|---|---|---|---|
| Emerson's agar | Very good, velvet-like | Brownish gray | Black brown | Pale black brown. |
| Czapek's agar | do | Brownish gray spotted with white. | Tan | A little purplish red brown. |
| Glucose—Czapek's agar | Good | do | Pale yellow | Pale grayish and yellowish green or a little brown. |
| Glycerol—Czapek's agar | do | Pale grayish red or brown | Grayish yellow-red | Black-brown or brown. |
| Glucose—Asparagine agar | Scant | Brownish gray spotted with white. | Gray | Dark grayish yellow. |
| Calcium malate agar | No growth | | | |
| Starch agar | Good, smooth | Light grayish yellow red | Pale yellowish red | Pale grayish red with brown. |
| Glucose agar | do | Brownish gray and white | Leghorn color | Pale grayish yellow or brownish yellow. |

TABLE—Continued

| | Growth | Aerial mycelium | Vegetative mycelium (reverse) | Soluble pigment |
|---|---|---|---|---|
| Glucose broth | Scant, slight growing on bottom. | | | No. |
| Starch—Ammonium agar | Scant | No | Grayish white or yellowish white. | No. |
| Bouillon agar | Very good | Pale grayish red and white | Grayish red | Pale black brown. |
| Glycerol-Starch—Glutamate agar | Very good, velvet-like | Brownish gray | Gray or brown | Do. |
| Gelatin stab | Scant, liquified strong | Gray or white | | Very pale brown. |
| Egg—Albumin agar | Scant | Brownish gray (poor growth). | Very pale yellow | No. |
| Shinobu's Tyrosine agar | Very good, velvet-like | Very pale greenish white and gray. | Black brown or dark brown. | Purplish dark red brown. |
| Yeast extracts agar | Very good | Brownish gray and white | Pale grayish yellow or dull yellow. | Pale black brown or pale brown. |
| Skim milk | Good, peptonized | Gray | | |
| Pepton solution | Good | Brownish gray | | Black brown or brown. |
| Glycerol agar | do | do | Dull red or pale brown | Dull red or pale brown. |
| Agar | Scant | No | White | No. |
| Potato plug | No growth | | | |

Physiological properties

Suitable temperature for growth: 33° C.–35° C.
Oxygen: Aerobic
Nitrate reduction: Positive
Tyrosinase activity: Positive
Amylase activity: Positive
Cellulase activity: Positive (weak)
Utilization of carbon elements: Good utilization for Glycerol, Sucrose, D-glucose, D-mannose, D-mannit, D-galactose, Lactose, and Dextrin.

When the above-mentioned properties are compared with the data on both Bergey's Manual of Determination of Bacterialogy, seventh Edition (1957) and S. A. Waksman's The Actinomycetes (1967), the *Streptomyces tanakasis* sp. 4680 is similar to *Streptomyces olivochromogenes*, *Streptmyces flavochromogenes*, and *Streptmyces diastatochromogenes*, but differs in the following characteristics:

| | *Streptmyces tanakasis* sp. 4580 | *Streptomyces olivochromogenes* | *Streptomyces diastato-chromogenes* | *Streptomyces flavochromogenes* |
|---|---|---|---|---|
| Aerial mycelium | Open spiral | Closed spiral | | |
| Ca-malate agar | Aerial mycelium — No growth | | Gray | White. |
| | Colony — do | | Colorless | Yellow. |
| Starch agar | Aerial mycelium — Pale grayish yellow red | Slight growth, colorless | Gray | White. |
| | Soluble pigment — Pale grayish red with brown | Colorless | Colorless | |
| | Colony — Grayish yellow red with brown | | Colorless | Yellow. |
| Glucose agar | Aerial mycelium — Gray to white | Brown to black | Gray | |
| | Soluble pigment — Pale grayish yellow or brownish yellow. | | Colorless | Brown. |
| | Colony — Gray to white | | Colorless | |
| Potato plug | Aerial mycelium — No growth | Slight growth | Gray | White. |
| | Soluble pigment | | Black | |
| | Colony | Black | Gray | Yellow. |
| Suitable temperature for growth | 33° C.–35° C. | 37° C | 35° C | 35° C. |
| Gelatin | Grayish white | | Gray | Yellow. |

In consequence of above comparison, the *Streptomyces tanakasis* sp. 4680 is reasonably thought to be a variety of one of three Actinomycete, though it has such differences as mentioned above from the latter.

Properties of a salted out crude enzyme sample of the thermostable protease which is produced by this strain have been investigated. The test enzyme solution contains $1/100$ mole of $Ca^{++}$ except in special cases. The most suitable pH is 11.0; the active range is pH 5.0–13.0. The relation between pH and stability is shown in Table 1:

TABLE 1—RELATION BETWEEN pH AND ACTIVITY

| pH: | Activity (extinction coefficient) |
|---|---|
| 6.0 | 0.21 |
| 7.0 | 0.38 |
| 8.0 | 0.45 |
| 9.0 | 0.51 |
| 10.0 | 0.65 |
| 10.2 | 0.80 |
| 11.2 | 0.86 |
| 12.5 | 0.75 | pH stability; i.e. the remaining activity, is more than 90% pH 4.5–11.0 after heat treatment at 30° C. for 24 hours and at pH 5.0–9.5 after treatment at 70° C. for 10 minutes; furthermore it is more than 50% at pH 6.0–7.5 even after treatment at 80° C. for 10 minutes:

TABLE 2—pH STABILITY

30° C., 24 Hours

| pH: | Remaining Activity (percent) |
|---|---|
| 3.0 | 9.0 |
| 3.4 | 75 |
| 4.5 | 98 |
| 5.8 | 100 |
| 6.8 | 100 |
| 7.7 | 100 |
| 9.4 | 100 |
| 10.1 | 100 |
| 11.0 | 100 |
| 11.6 | 55 |

70° C., 10 min.

| pH: | Remaining Activity (percent) |
|---|---|
| 3.0 | 9.0 |
| 3.9 | 30 |
| 4.9 | 90 |
| 5.9 | 95 |
| 6.6 | 95 |
| 7.7 | 95 |
| 9.3 | 92 |
| 10.0 | 85 |
| 10.9 | 50 |
| 11.3 | 23 |

80° C., 10 min.

| pH: | Remaining Activity (percent) |
|---|---|
| 4.7 | 19 |
| 5.9 | 47 |
| 6.8 | 58 |
| 7.8 | 55 |
| 8.3 | 35 |

Regarding thermostability, the remaining activity is almost 100% after treatment at 50° C. for one hour, and 70% even after treatment at 70° C. for one hour. This is illustrated in FIG. 1, and Table 3.

TABLE 3.—THERMOSTABILITY
(Percent of remained activity at pH 6.9)

| Temperature (° C.): | Time (min.) | | |
|---|---|---|---|
| | 10 | 30 | 60 |
| 50 | 100 | 100 | 98 |
| 70 | 93 | 82 | 77 |
| 85 | 37 | 0 | |

Regarding the relation between temperature and activity, the maximum activity appears nearly at 80° C., which is about fifteen times the activity at 30° C. This is illustrated in FIG. 2 and Table 4.

TABLE 4—RELATION BETWEEN TEMPERATURE AND ACTIVITY

| Temperature (° C.): | Relative activity (percent) |
|---|---|
| 30 | 7 |
| 40 | 15 |
| 50 | 33 |
| 60 | 47 |
| 70 | 98 |
| 80 | 100 |
| 90 | 30 |
| 100 | 12 |

Figure 4:
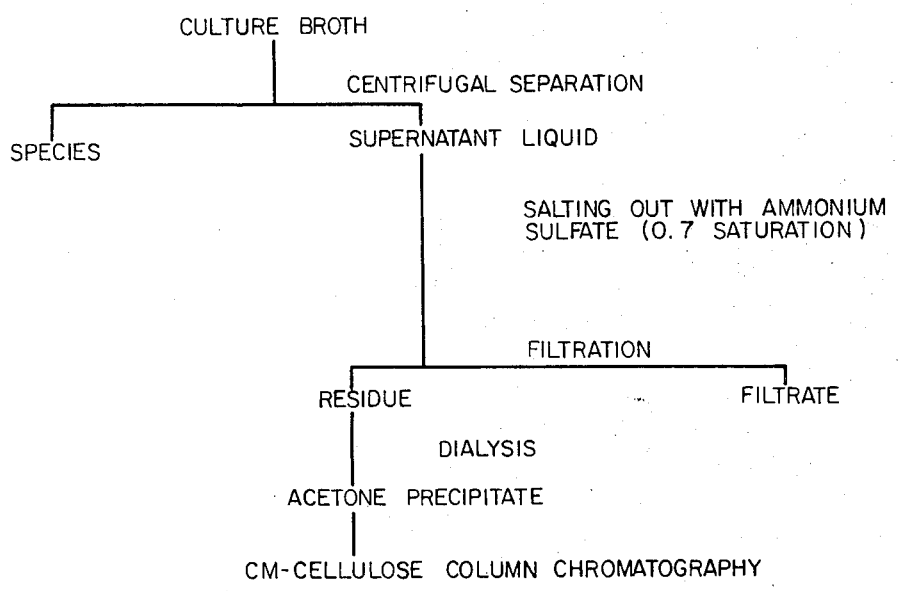
FIG. 4 shows a method of purification of the protease.

One example of the method of purification is shown in FIG. 4 and the pattern obtained by CM-Cellulose column chromatography is shown in FIG. 3, where (A) shows protein and (B) shows protease activity. The column was 3 x 80 cm.; CM-Cellulose was equilibrated with 1/200 M. acetate buffer (pH 4.7), and a gradient elution was carried out with 0.09 mole sodium chloride in the same buffer. Although it is a single peak in view of a CM-Cellulose column chromatography, enzyme of higher purity can be obtained by varying diversely the purification method. Influence of various enzyme inhibitors is shown in Table 6.

TABLE 6.—INFLUENCE OF INHIBITION BY VARIOUS COMPOUNDS
(Remaining activities after treatment at 30° C. for 30 min.)

| Compound | Remained activity, percent | Compound | Remained activity, percent |
|---|---|---|---|
| $Ca(CH_3COO)_2$ | 92 | KCN | 106 |
| $ZnSO_4$ | 93 | $KMnO_4$ | 0 |
| $MgSO_4$ | 94 | EDTA | 86 |
| $FeCl_3$ | 80 | NBS | 19 |
| $CuSO_4$ | 80 | No addition | 100 |

In Table 6, an aqueous solution of the acetone precipitate without addition of $Ca^{++}$ was used as enzyme, in which 1/200 mole of each compound was added, $Zn^{++}$, $Mg^{++}$, $Fe^{+++}$, $Ca^{++}$, and KCN had almost no inhibitous effect, but oxidants such as $KMnO_4$, NBS, etc. were completely inhibitory. This enzyme can provide hydrolysis of protein of 80–90%, and also has a strong action of curdiness.

In consequence of the above fact, the thermostable protease produced by the Actinomycete, *Streptomyces tanakasis* sp. 4680 is therefore an excellent protease.

A specimen of *Streptomyces tanakasis* sp. 4680, has been deposited with the United States Department of Agriculture Northern Regional Research Laboratory, at Peoria, Ill., United States of America, and has been given the number NRRL 5402; a sample of this microorganism can be obtained from aforementioned Research Laboratory. (The deposit was made with aforementioned Research Laboratory with all restrictions on the availability to the public being irrevocably removed upon the granting of the patent.)

The following nonlimitative examples are provided for the purpose of illustrating the invention.

EXAMPLE I

| Culture medium 1: | Percent |
|---|---|
| Dextrin | 2.0 |
| Defatted soybean powder | 2.0 |
| Yeast extract | 0.2 |
| Potassium phosphate | 0.9 |
| Calcium carbonate | 0.5 |
| pH: 7.0. | |

Into 80 ml. of the above culture medium 1 contained in a Sakaguchi's flask of 500 ml. in volume, one loopful of the *Streptomyces tanakasis* sp. 4680, prepared by means of slant culture, is inoculated. The seed culture is obtained after the above inoculated medium 1 by shaking at 30° C. for 96 hours. Then, 80 ml. of the same culture medium 1 is put in a Sakaguchi's flask of 500 ml. in volume, to the extent of approximately 2.0% of the seed thus obtained is inoculated therein, and culture with shaking is carried out at 30° C. for 96 hours. This produces the enzyme of about 3,500 units/ml. in the supernatant liquid of the above cultivated broth.

Measurement of the protease activity

Half of the enzyme solution is added to 3 ml. of 0.6% casein solution containing 1/20 mole of buffer solution (pH 11.0), and the mixture is reacted at 30° C. for 10 min. Then, after 3 ml. of 0.11 mole trichloroacetic acid mixture is added thereto, the precipitate is filtered out, and the extinction coefficient of the filtrate at 275 m$\mu$ is measured. One unit is the amount that can separate for one minute the protein which is soluble in the mixture and proportionate to 1 mcg. of tyrosine.

EXAMPLE II

| Culture medium 2: | Percent |
|---|---|
| Malt syrup (made by Hayashihara Co.) | 2.0 |
| Defatted soybean powder | 2.0 |
| Yeast extract | 0.1 |
| Potassium phosphate | 0.1 |
| Calcium carbonate | 0.1 |
| pH: 7.0. | |

When a submerged culturing at 30° C. for about 48 hours by 30 l. jar fermentor is carried out in use of 15 l. of the above-mentioned culture medium 2, the *Streptomyces tanakasis* sp. 4680 produces the protease of about 5,600 units/ml.

EXAMPLE III

The protease of Example II was added to 2.2 kilograms of raw egg with an adjusted pH value of 9.0. Stirring continued for 4 hours at 65° C. to effect a hydrolytic reaction. After hydrolysis, the enzyme was inactivated by boiling for 30 minutes at 100° C., and the pH value was readjusted to 7.0. Spaghetti dough was prepared by mixing 10 kg. of semolina, 2.2 kg. of the treated egg, and 2.25 liters of water. The resultant spaghetti dough was molded and dried by an ordinary spaghetti-making machine.

What is claimed is:

1. A method of producing an improved protease which comprises preparing a culture medium of *Streptomyces tanakasis* sp. 4680 under conditions facilitating production of said protease, and isolating said protease from said culture medium, said protease having a high degree of thermostability and being capable of reducing protein into simpler peptide units.

References Cited
UNITED STATES PATENTS
3,579,454   5/1971   Collier ............ 195—66 R X LIONEL M. SHAPIRO, Primary Examiner